(12) United States Patent
Lou et al.

(10) Patent No.: US 6,937,626 B2
(45) Date of Patent: Aug. 30, 2005

(54) MULTIPLE WAVELENGTH PULSED SOURCE

(75) Inventors: Janet Lou, Alexandria, VA (US); Thomas Clark, Columbia, MD (US); Marc Currie, Arlington, VA (US); Thomas Carruthers, Laurel, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 53 days.

(21) Appl. No.: 10/245,635

(22) Filed: Sep. 18, 2002

(65) Prior Publication Data

US 2004/0052276 A1 Mar. 18, 2004

Related U.S. Application Data

(60) Provisional application No. 60/379,104, filed on May 10, 2002.

(51) Int. Cl.[7] .............................. H01S 3/30; H01S 3/123; H04J 14/02
(52) U.S. Cl. ............................... 372/6; 372/15; 359/124
(58) Field of Search .................. 372/3, 6, 15; 359/134, 359/179, 124, 161; 385/11, 24, 31–35; 356/479, 497

(56) References Cited

U.S. PATENT DOCUMENTS

| | | | | |
|---|---|---|---|---|
| 5,574,739 | A | | 11/1996 | Carruthers |
| 6,023,360 | A | * | 2/2000 | Morioka et al. ................ 398/1 |
| 6,137,604 | A | * | 10/2000 | Bergano ........................ 398/1 |
| H1926 | H | | 12/2000 | Carruthers |
| 6,229,937 | B1 | * | 5/2001 | Nolan et al. .................. 385/24 |
| 6,292,288 | B1 | * | 9/2001 | Akasaka et al. ............ 359/334 |
| 6,567,430 | B1 | * | 5/2003 | Freeman et al. ................ 372/3 |
| 6,567,577 | B2 | * | 5/2003 | Abbott et al. ................ 385/24 |

OTHER PUBLICATIONS

Carruthers, T. F., "10GHz, 1.3–ps erbium fiber laser employing soliton pulse shortening" Opt. Lett., 21, 1927–1929 (1996).
Schalger, J.B., "Dual wavelength pulse generation using mode–locked erbium–doped fibre ring laser" Electron. Lett., 27, 2072–2073 (1991).
Li, S., "A novel configuration for multiwavelength actively mode–locked fiber lasers using cascaded fiber bragg gratings," IEEE Photon. Technol. Lett., 11, 179–181 (1991).
Chen, L.R., "Dual–Wavelength Actively Mode–Locked Fibre Laser with 0.7 nm Wavelength Spacing" Electron. Lett., 36, 1921–1923 (2000).
Town, G.E., "Dual Wavelength Modelocked Fiber Laser" IEEE Photon. Technol. Lett., 12, 1459–1461 (2000).
Yao, J., "Active mode locking of tunable multi–wavelength fiber ring laser" Opt. Commun., 191, 341–345 (2001).

(Continued)

*Primary Examiner*—Minsun Oh Harvey
*Assistant Examiner*—Phillip Nguyen
(74) *Attorney, Agent, or Firm*—John J. Karasek; Sally A. Ferrett (57) ABSTRACT

A multiple wavelength laser apparatus is taught to select wavelengths for simultaneous generation of short pulses at multiple wavelengths having application in wavelength-division-multiplexed communications systems, photonic microwave systems, and pump-probe applications. The multiple wavelength laser comprises an optical fiber lasing material, a laser pump source connected to said lasing material for outputting coherent light, a splitter for dividing said coherent light into parallel paths of differing wavelengths, parallel band pass filters for selecting multiple wavelengths, and parallel Faraday mirrors for operating the multiple wavelength laser in a single polarization state.

33 Claims, 7 Drawing Sheets

OTHER PUBLICATIONS

Bakhshi, B., "Dual–wavelength 10–GHz actively mode–locked erbium fiber laser" IEEE Photon. Technol. Lett., 11, 1387–1389 (1999).

Li, Z., "A dual–wavelength and dual–repetitiion–rate actively mode–locked fiber ring laser" Opt. Commun., 185, 381–385 (2000).

Noske, D.U., "Dual–wavelength operation of a passively mode–locked "figure–of–eight" ytterbium–erbium fibre soliton laser" Opt. Commun., 108, 297–301 (1994).

Okhotnikov, O.G., "Stable Single–and Dual–Wavelength Fiber Laser Mode Locked and Spectrum Shaped by a Fabry–Perot Saturable Absorber" Opt. Lett., 25, 1624–1626 (2000).

Pattison, D.A., "Actively Modelocked Dual–Wavelength Fiber Laser with Ultra–Low Inter–Pulse–Stream Timing Jitter" Photon. Technol. Lett., 12, 1415–1417 (1995).

Deparis, D., "Round–trip time and dispersion optimization in a dual–wavelength actively mode–locked Er–doped fiber laser . . . " IEEE Photon Technol. Lett., 11, 1238–1240 (1999).

Clark, T.R., "Phase noise measurements of ultrastable 10GHz harmonically modelocked fibre laser" Electron Lett., 35, 720–721 (1999).

Ng, W., "Ultra–low jitter modelocking of Er–fibre laser at 10GHz and its application in photonic sampling for analogue–to–digital conversion" Electron. Lett.,37, 113–115(2001).

Becker, P.C., Erbium–Doped Fiber Amplifiers: Fundamentals and Technology, Academic Press: New York, 1999, P. 108–122.

Zyskind, J.L., "Determination of homogeneous linewidth by spectral gain hole–burning in an erbium–doped fiber amplifier . . . " IEEE Photon. Technol. Lett., 2, 869–871 (1990).

Yao, J., "Active mode locking of tunable multi–wavelength fiber ring laser", Opt. Commun., vol. 191, pp. 341–345, May 2001.

Lou, J. W., "Multiple–Wavelength Mode–Locked Erbium–Doped Fiber Sigma Laser", CLEO 2001 Baltimore, MD, May 6–11, 2001.

Lou, J. W. , "Mode–Locked multiple–wavelength Erbium–doped fiber laser in a sigma configuration", IEEE Photon, Technol. Lett., vol. 14, pp. 281–283, Mar., 2002.

* cited by examiner

MULTIPLE WAVELENGTH PULSED SOURCE

CROSS-REFERENCE TO RELATED APPLICATIONS

This application claims the benefit of provisional application Ser. No. 60/379,104, entitled "Multiple Wavelength Pulsed Laser Source", filed on May 10, 2002.

BACKGROUND OF THE INVENTION

1. Field of the Invention

This invention deals generally with the simultaneous generation of short pulses at multiple wavelengths, which is of particular interest to wavelength-division-multiplexed communication systems, photonic microwave systems, and pump-probe applications. A versatile and cost-effective laser source should have the following characteristics. Synchronized multiple-wavelength outputs eliminate the need for external synchronization when using more than one wavelength. Short pulses of less than 10 ps are needed for gigahertz repetition rates. The instant invention is a multiple-wavelength laser based on the sigma configuration, well known in the prior art, which has tunable wavelength, synchronized outputs, short pulses, and low noise.

2. Description of the Related Prior Art

Mode-locked pulse generation at multiple-wavelengths has been studied in various configurations of erbium-doped fiber lasers. The focus has primarily been on variations in the ring cavity design. Schlager, et al., have proposed a method that incorporates 3.4 km of birefringent fiber and a polarizing isolator in the cavity (See J. B. Schlager, S. Kawanishi, and M. Saruwatari, "Dual wavelength pulse generation using mode-locked erbium-doped fiber ring laser," Electron. Lett., 27, 2072–2073 (1991)). Other techniques for selecting the wavelength for ring cavity lasers utilize fiber Bragg gratings, power splitters and bandpass filters, and dense-wavelength-division-multiplexers. Passively modelocked lasers are demonstrated in a figure-eight configuration by Noske, et al. and in a linear configuration by Okhotnikov, et al. (See D. U. Noske, M. J. Guy, K. Rottwitt, R. Kashyap, and J. R. Taylor, "Dual-wavelength operation of a passively mode-locked "figure-of-eight" ytterbium-erbium fiber soliton laser," Opt. Commun., 108, 297–301 (1994) and O. G. Okhotnikov and M. Guina, "Stable Single- and Dual-Wavelength Fiber Laser Mode Locked and Spectrum Shaped by a Fabry-Perot Saturable Absorber," Opt. Lett., 25, 1624–1626 (2000)). An actively-modelocked linear cavity laser with fiber gratings as the ends of the cavity and a nonlinear optical loop mirror in the middle has been demonstrated by Pattison et al. (See D. A. Pattison, P. N. Kean, J. W. D. Gray, I. Bennion, and N. J. Doran, "Actively Modelocked Dual-Wavelength Fiber Laser with Ultra-Low Inter-Pulse-Stream Timing Jitter," Photon. Technol. Lett., 12, 1415–1417 (1995)) A modified sigma configuration laser, which used a circulator followed by cascaded fiber gratings in a second arm is demonstrated by Deparis, et al. (See O. Deparis, R. Kiyan, E. Salik, D. Starodubov, J. Feinberg, O. Pottiez, P. Megret, and M. Blondel, "Round-trip time and dispersion optimization in a dual-wavelength actively mode-locked Er-doped fiber laser including non-chirped fiber bragg gratings," IEEE Photon. Technol. Lett., 11, 1238–1240 (1999)). These lasers produce either broad pulse widths (>10 ps) or wide wavelength separations (>15 nm). This limits the ability of the laser to produce high repetition rates and limits the total number of wavelengths that are possible within the gain bandwidth of the amplifying media. Additionally, wide wavelength tuning ranges have not previously been demonstrated.

SUMMARY OF THE INVENTION

An object of the invention is to provide a laser device capable of simultaneous generation of short pulses at multiple wavelengths which has application in wavelength-division-multiplexed communications systems, photonic microwave systems, and pump-probe applications.

Another object of the invention is to provide a laser with tunable wavelengths to allow the user to choose whichever wavelength is needed, or to scan over a range of wavelengths.

Another object of the invention is to provide a laser capable of synchronized multiple-wavelength outputs that eliminate the need for external synchronization when using more than one wavelength.

Another object of the invention is to provide a laser capable of producing short pulses of less than 10 ps which can achieve gigahertz repetition rates.

Another object of the invention is to provide a practical laser with amplitude fluctuations which are minimal, and timing jitter which is much less than the bit period.

Another object of the invention is to provide a laser with a series of fixed wavelengths in those applications which do not require tunability.

Another object of the invention is to provide a multiple wavelength laser based on the sigma configuration which has tunable wavelength, synchronized outputs, short pulses, and low noise.

DESCRIPTION OF THE PREFERRED EMBODIMENT

Figure 1:
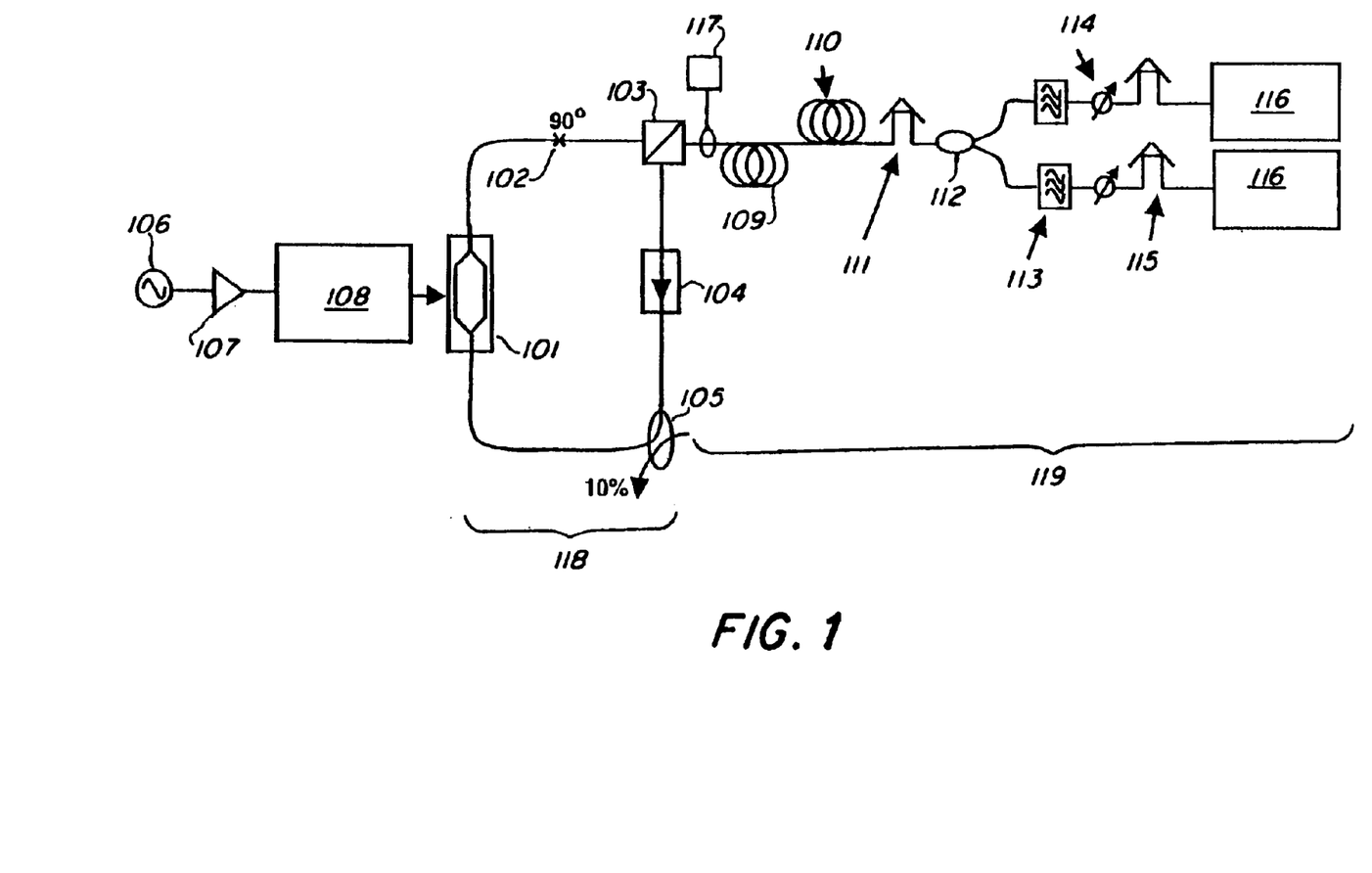
FIG. 1 shows a schematic diagram of two wavelength sigma laser. The different wavelength pulses in the cavity share the same gain medium, but each wavelength passes through a separate bandpass filter, attenuator, fiber delay line, and Faraday mirror.

A schematic block diagram of a dual wavelength fiber laser is shown in FIG. 1. The laser is divided into two sections, a polarization-maintaining (PM) loop 118, in which all components and connecting fibers maintain the circulating light in a specific linear polarization state; and a single-polarization branch 119, in which the polarization state is not fixed.

Light is generated in the single-polarization branch 119, which will be described later, and is routed into the PM loop 118 by the polarization beam splitter 103. A single-polarization isolator 104 ensures that light circulates in the PM loop in a specific direction and in a specific linear polarization state. A portion of the circulating light exits the laser in a linearly-polarized state by means of the output coupler 105. The remainder of the light is routed from the output coupler to the modulator 101.

The modulator 101 is a Mach-Zehnder electro-optic modulator with a radio-frequency (rf) bandwidth of at least 10 gigahertz (GHz). The modulator is electrically driven by a signal originating in an rf synthesizer 101, which produces an electrical sine-wave output with a frequency of 960 megahertz (MHz) and an output power of roughly 10 milliwatts (mW). The signal is then amplified by an rf amplifier to a level of approximately 500 mW and is converted by the step-recovery diode 108 into a periodic series of pulses with a duration of approximately 100 picoseconds (ps), an amplitude of approximately 10 volts (V), and with the same repetition rate as the synthesizer 106. The output of the step-recovery diode 108 is sent to the electrical input port of the modulator 101. The modulator, when thus driven, imposes an amplitude modulation on the light passing through it with the same repetition rate as the synthesizer 101; the duration of time that the modulator periodically allows light to pass through it is roughly the same as the pulse width generated by the step-recovery diode 108.

The modulated light is then routed through a 90-degree splice 102 in the PM fiber connecting it to the polarization beam splitter 103, to orient it into a proper polarization state to be routed by the polarization beam splitter 103 out of the PM loop 118 and into the single-polarization branch 119. The light is amplified by a length of Erbium (Er) doped gain fiber 109, which is excited by a laser pump source 117; in this instance the laser pump source 117 is a laser diode generating approximately 130 mW of optical power at a wavelength of approximately 980 nanometers (nm). The saturated output power of the Er-doped fiber amplifier is approximately 15 mW. The light then passes through approximately 270 meters (m) of SMF-28 "standard" fiber, which provides intracavity dispersion compensation; the total average dispersion of the laser cavity is approximately 11.6 ps/(nm·km).

The light then passes though a variable fiber delay line 111, which, in concert with variable fiber delay lines 114 and 115, ensures that the round-trip circulation time of a pulse through the laser is an integral submultiple of the driving frequency of the rf synthesizer 106. The laser is thus harmonically mode-locked at the rate of the driving synthesizer 106 of 960 MHz. The light is then sent to a splitter, specifically in this embodiment the 3-dB coupler 112, which channels the light into two parallel paths. Tunable band-pass filters 113 with bandwidths of 0.8 nm select the wavelength of the light in each path; variable attenuators 114 compensate any wavelength-dependent gain of the Er-doped fiber amplifier 109 to keep the optical intensities in each path roughly the same. The variable fiber delay lines 115 in each path ensure that the propagation time of the light through each path is approximately equal.

The two paths are terminated with Faraday mirrors 116, the function of which is to reflect light into a polarization state which is orthogonal to the incident state. Light injected into the single-polarization branch by the polarization beam splitter 103 is initially linearly polarized, but the polarization state evolves in a random manner as the light propagates through the fiber and components of the branch. Since this polarization state evolution occurs in a roughly linear process, the Faraday mirrors 116 ensure that, at each point in the single-polarization branch, returning light is in a polarization state approximately orthogonal to that of the incident light. Therefore, since light injected by the polarization beam splitter is linearly polarized, the light returning to it is also approximately linearly polarized but is rotated by approximately 90 degrees. Light in this polarization state is sent by the polarization beam splitter 103 to the isolator 104, thus completing the circuit of light through the laser. The two light paths created by the splitter 112 are recombined by the same component into one path on the return trip. The light thus makes a round trip through the single-polarization branch 119, passing through each component twice.

The band-pass filters 113 in the two paths of the single-polarization branch 119 select the wavelengths of light pulses that the laser emits. Since the dispersion of the laser is maintained at a low value by the dispersion-compensating fiber 110, the pulses exit the laser through the output coupler 105 at approximately the same time. The durations of the light pulses are determined primarily by the the duration of time that the modulator 101 periodically allows light to pass through it and by the bandwidth of the tunable bandpass filters 113.

Though the components used in this embodiment have specific properties and values, the laser will operate in a similar manner with other components with other properties. For instance, though the rf synthesizer 106 in this embodiment operates at a frequency of 960 MHz, lasers of this type have been operated at rates varying from 100 MHz to more than 40 GHz; in another instance, though the duration of the pulses from this laser are in the range of approximately 10 to 20 ps, other lasers of this type have produced pulses with durations ranging from approximately 0.1 to 100 ps; and operation outside these ranges is possible with appropriate selections of component types and values.

Figure 2:
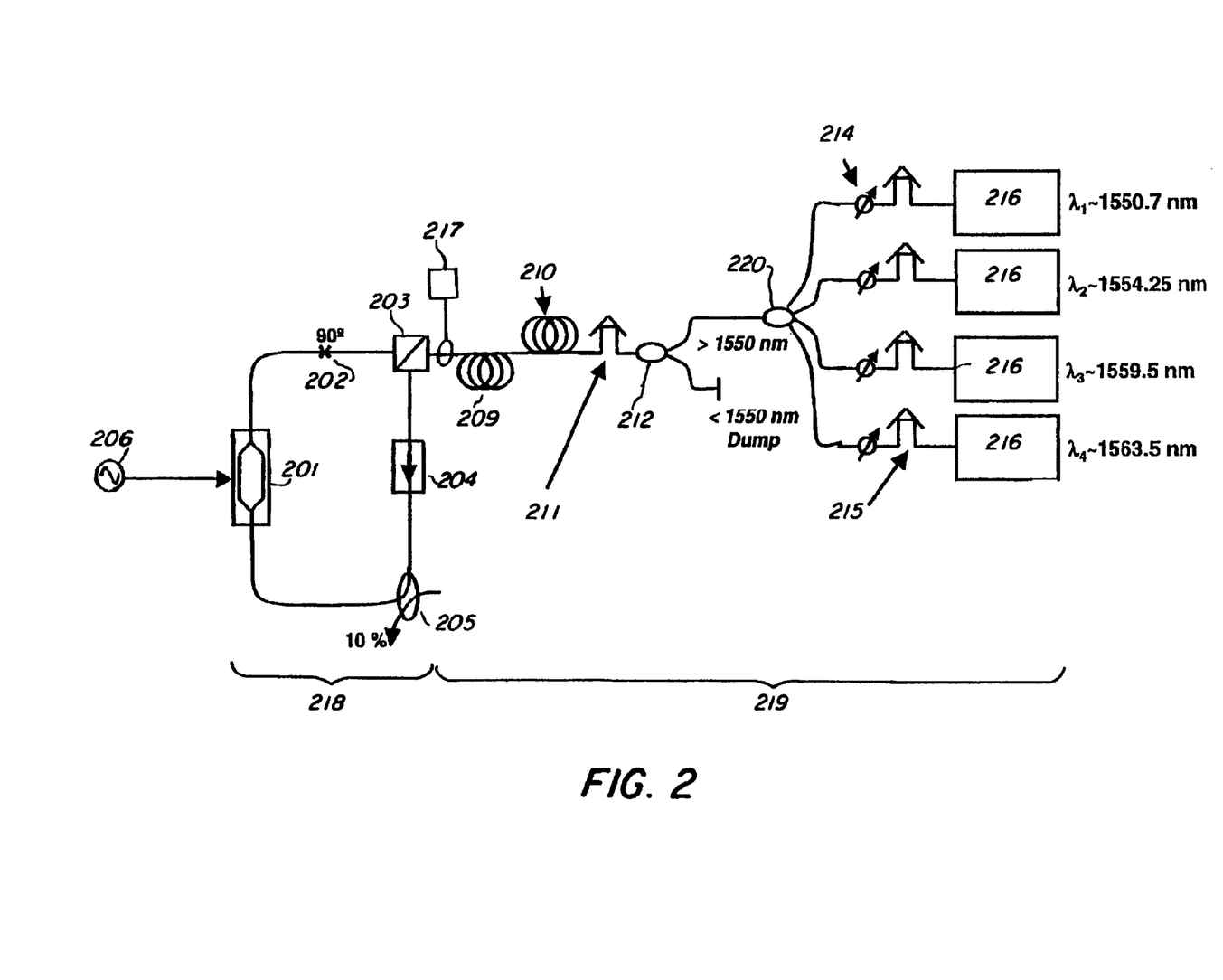
FIG. 2 shows a schematic diagram of a multiple wavelength laser. The different wavelength pulses in the cavity share the same gain medium, but each wavelength passes through a separate bandpass filter, attenuator, fiber delay line, and Faraday mirror.

An embodiment incorporating both a higher repetition rate and having a four-wavelength fiber laser is shown in the schematic block diagram of FIG. 2. The laser is divided into two sections, a polarization-maintaining (PM) loop 218, in which all components and connecting fibers maintain the circulating light in a specific linear polarization state; and a single-polarization branch 219, in which the polarization state is not fixed.

Light is generated in the single-polarization branch 219, which will be described later, and is routed into the PM loop 218 by the polarization beam splitter 203. A single-polarization isolator 204 ensures that light circulates in the PM loop in a specific direction and in a specific linear polarization state. A portion of the circulating light exits the laser in a linearly-polarized state by means of the output coupler 205. The remainder of the light is routed from the output coupler to the modulator 201.

The modulator 201 is a Mach-Zehnder electro-optic modulator with a radio-frequency (rf) bandwidth of at least 10 gigahertz (GHz). The modulator is electrically driven by a signal originating in an rf synthesizer 206 which produces an electrical sine-wave output with a frequency of 10 GHz and an output power of roughly 12 milliwatts (mW). The output of the rf synthesizer 206 is sent to the electrical input port of the modulator 201. The modulator, when thus driven, imposes an amplitude modulation on the light passing through it with the same repetition rate as the synthesizer 206; the duration of time that the modulator periodically allows light to pass through it is roughly the same as one period of the sine-wave output of the rf synthesizer 206, which in this embodiment is approximately 100 ps.

The modulated light is then routed through a 90-degree splice 202 in the PM fiber connecting it to the polarization beam splitter 203, to orient it into a proper polarization state being routed by the polarization beam splitter 203 out of the PM loop 218 and into the single-polarization branch 219. The light is amplified by a length of Erbium (Er) doped gain fiber 209, which is excited by a laser pump source 217; in this instance the laser pump source 217 is a laser diode generating approximately 130 mW of optical power at a wavelength of approximately 980 nanometers (tim). The saturated output power of the Er-doped fiber amplifier is approximately 20 mW. The light then passes through approximately 45 meters (in) of SMF-28 (standard) fiber, which provides intracavity dispersion compensation; the total average dispersion of the laser cavity is approximately 1.9 ps/(nm×km).

The light then passes through a variable delay line 211, which, in concert with variable fiber delay lines 115, ensures that the round-trip circulation time of a pulse through the laser is an integral submultiple of the driving frequency of the rf synthesizer 206. The laser is this harmonically mode-locked at the rate of the driving synthesizer 206 of 10 GHz. The light is then sent to a splitter, specifically in this embodiment the broadband wavelength-division multiplexer (WDM) 212, which channels the light into two paths, each of which includes the desired wavelengths, a narrow band WDM 220 channels the light into four paths and selects a different wavelength with a bandwidth of 2.5 nm for each path; variable attenuators 214 compensate any wavelength-dependent gain of the Er-doped fiber amplifier 209 to keep the optical intensities in each path roughly the same. The variable fiber delay lines 215 in each path ensure that the propagation time of the light through each path is approximately equal.

The four paths are terminated with Faraday mirrors 216, the function of which is to reflect light into a polarization state that is orthogonal to the incident state. Light injected into the single-polarization branch by the polarization beam splitter 203 is initially linearly polarized, but the polarization state evolves in a random manner as the light propagates through the fiber and components of the branch. Since this polarization state evolution occurs in a roughly linear process, the Faraday mirrors 216 ensure that, at each point in the single-polarization branch, returning light is in a polarization state approximately orthogonal to that of the incident light. Therefore, since light injected by the polarization beam splitter is linearly polarized, the light returning to it is also approximately linearly polarized but is rotated by approximately 90 degrees. Light in this polarization state is sent by the polarization beam splitter 203 to the isolator 204, thus completing the circuit of light through the laser. The four light paths created by the WDMs 212 and 220 are recombined by the same components into one path on the return trip. The light thus makes a round trip through the single-polarization branch 219, passing through each component twice.

The narrow band WDM 220 in the single-polarization branch 219 divides the light into four paths, where the optical pass-band of each path corresponds to a select wavelength of light pulses that the laser emits. Since the dispersion of the laser is maintained at a low value by the dispersion-compensating fiber 210, the pulses exit the laser through the output coupler 205 at approximately the same time. The durations of the light pulses are determined primarily by the duration of time that the modulator 201 periodically allows light to pass through it and by the bandwidth of the narrow band WDM 220.

Though the components used in this embodiment have specific properties and values, the laser will operate with other components with other properties. For instance, though the rf synthesizer 206 in this embodiment operates at a frequency of 10 GHz, lasers of this type have been operated at rates varying from 100 MHz to more than 40 GHz; in another instance, though the duration of the pulses from this laser are in the range of approximately 10 to 20 ps, other lasers of this type have produced pulses with durations ranging from 0.1 to 100 ps; and operation outside these ranges is possible with appropriate selections of component values. Different wavelengths may be obtained by using different wavelength-division multiplexers with different optical pass-bands.

Figure 3:
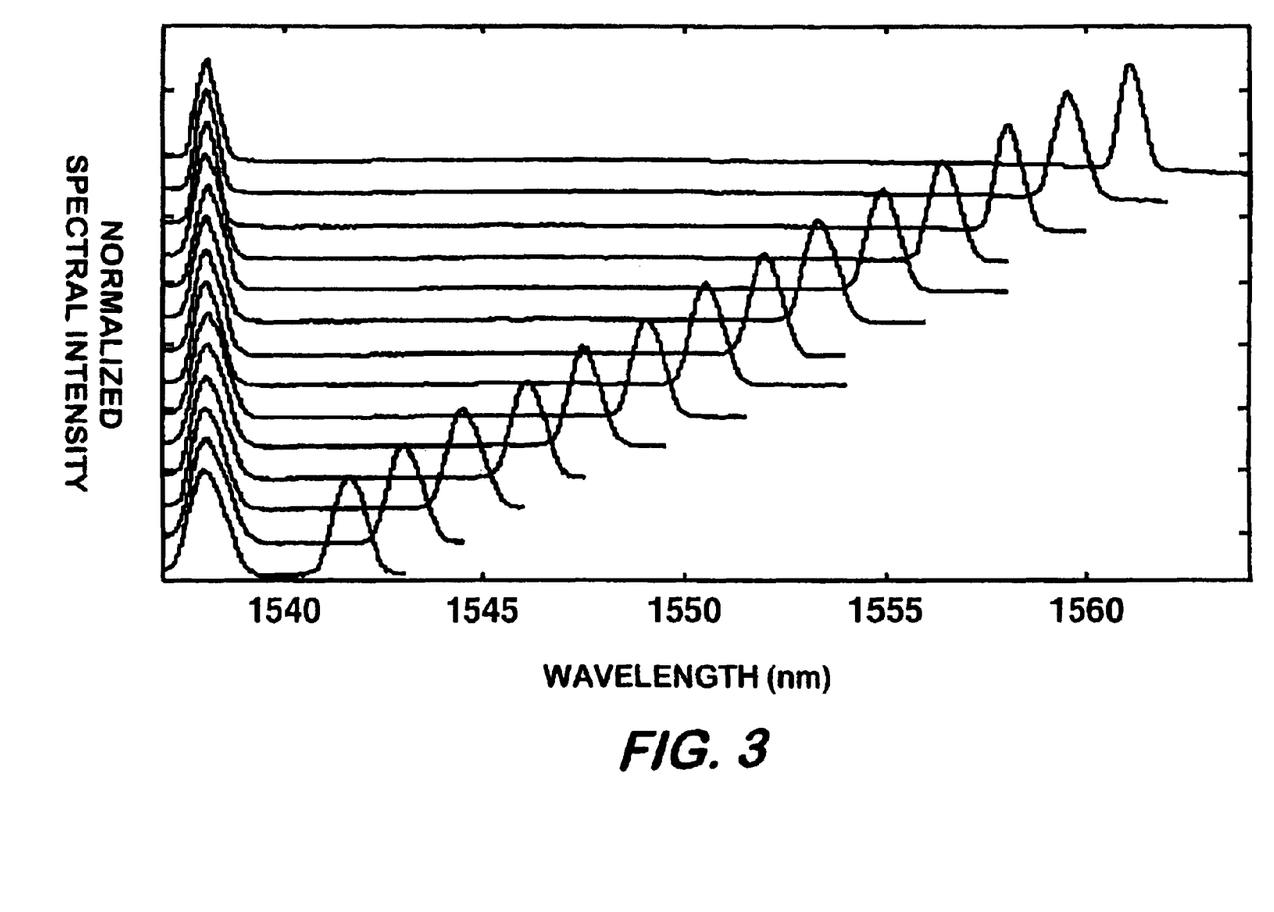
FIG. 3 shows optical spectra at a range of wavelength separations, tunable from 3.5 nm to 24 nm.

Variable wavelength separation operation is illustrated in FIG. 3, where one wavelength is fixed at 1538 nm and the other wavelength is tuned continuously from 1541.5 nm to 1562 nm. The maximum tuning range is set by the erbium gain bandwidth. Because of the dispersion in the cavity, each wavelength travels at a slightly different speed inside the cavity and thus, it is necessary to fine-tune the cavity length for each wavelength to ensure that the pulses arrive at the modulator at the same time. Therefore, the maximum tuning range of the cavity length also determines the maximum wavelength separation. The minimum wavelength separation is determined by the homogeneous linewidth of the erbium-doped fiber to be 3 to 4 nm. If the wavelength separation is less than 3 nm, gain competition between the wavelengths results in noisy operation. That is, while both wavelengths may continue to laser, pulse dropouts are observed, and eventually the lasing action of one wavelength will dominate over the other. Wavelength separation as low as 3 nm at 1550 nm and 1553 nm is possible.

Figure 4A:
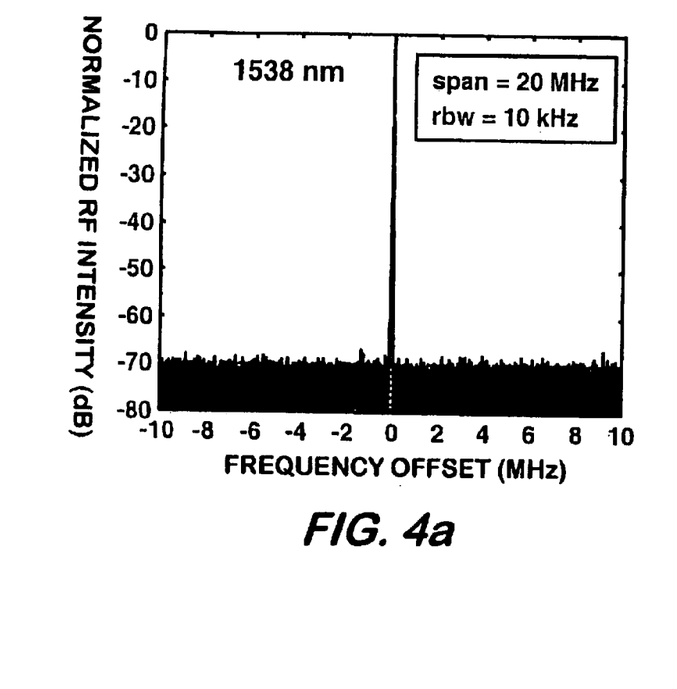
FIG. 4a shows RF spectrum of the laser output at 1538 nm.
Figure 4B:
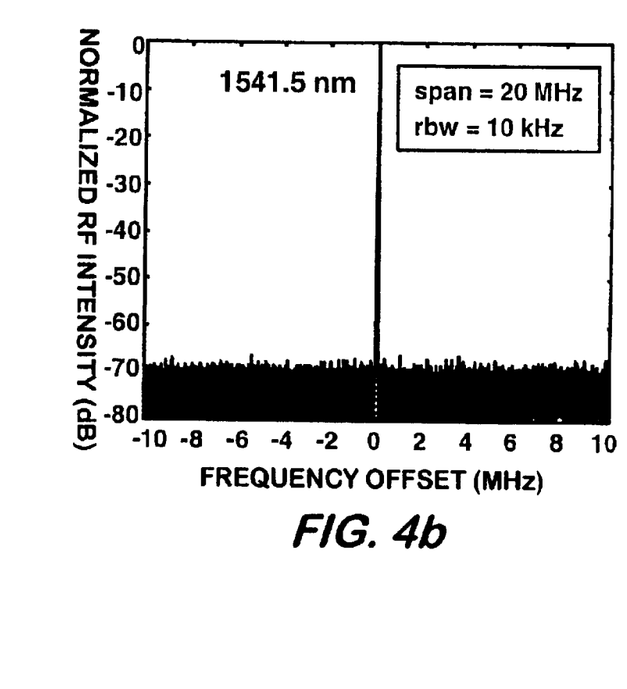
FIG. 4b shows RF spectrum of the laser output at 1541.5 nm.
Figure 5A:
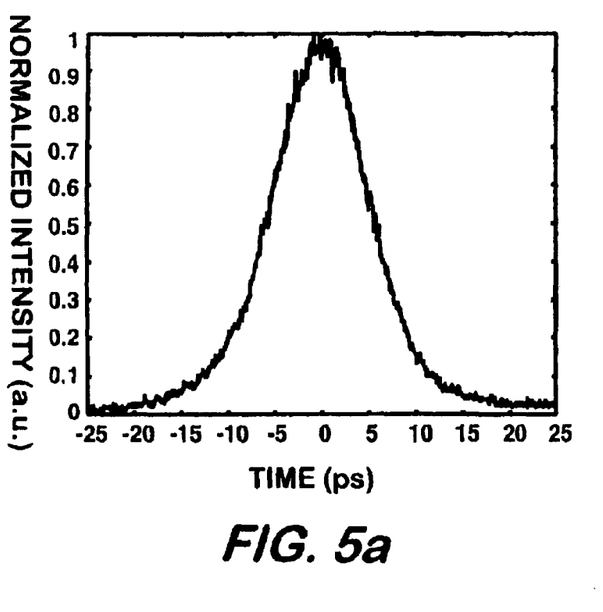
FIG. 5a shows a cross-correlation of pulses at 1538 nm and 1541.5 nm.
Figure 5B:
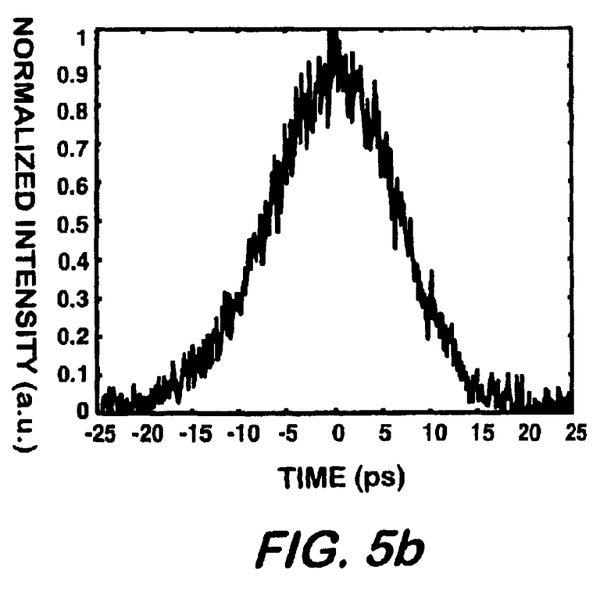
FIG. 5b shows a cross-con-elation of pulses at 1538 nm and 1560 nm.

Both wavelengths exit the laser at the same time. The laser has no pulse dropouts as evidenced by the greater than 70-dB supermode suppression shown in FIGS. 4a and 4b. We show the cross-correlation between the two wavelengths for the case of 3.5-nm separation (FIG. 5a) and for 22-nm separation (FIG. 5b). The cross-correlation between the 1538-nm pulse and the 1560-nm pulse appears broader because the pulse at 1560 nm is broader in than the 1541.5-nm pulse. This is because in optical fiber, the pulse width is a function of the dispersion at the pulse wavelength. Thus, while the dispersion is ideal for a transform limited pulse at 1541.5 nm, the dispersion is slightly higher at 1560 nm and the additional dispersion leads to a slightly broader pulse.

Figure 6A:
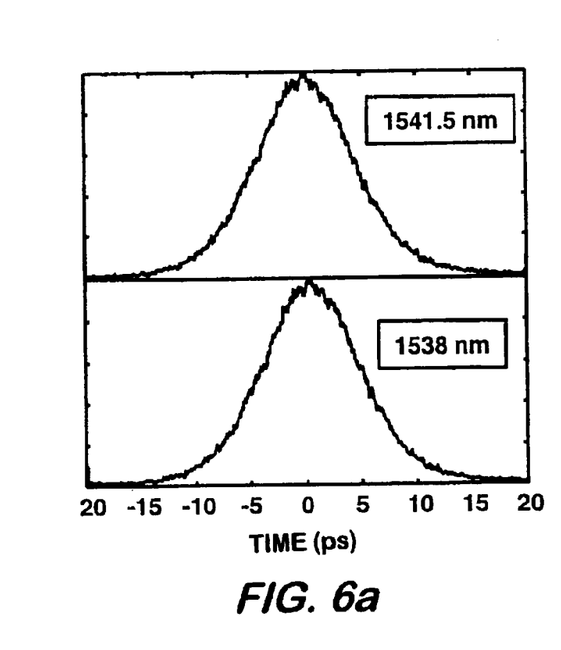
FIG. 6a shows autocorrelations of pulses at 1538 nm and at 1541.5 nm.
Figure 6B:
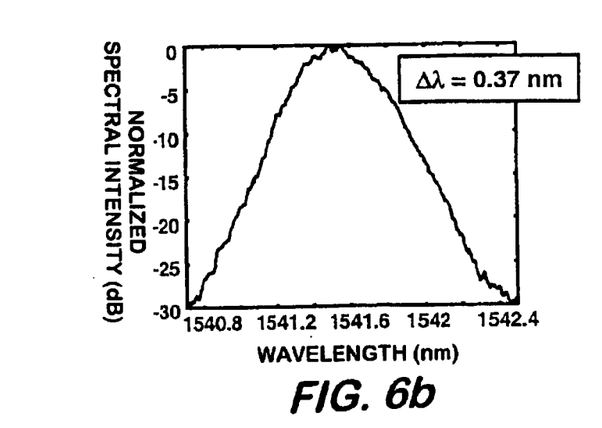
FIG. 6b shows autocorrelations of pulses at a spectral width of 0.37 nm at 1541.5 nm.
Figure 6C:
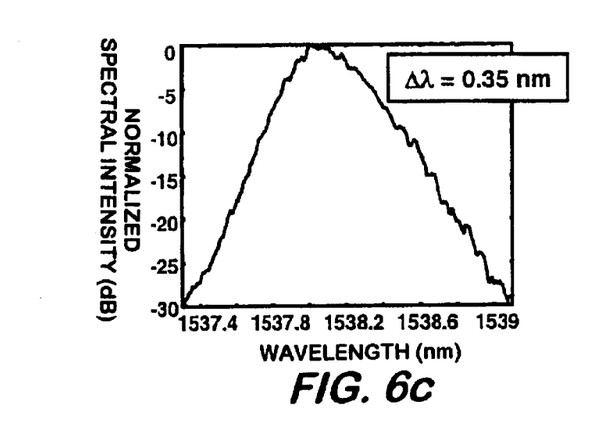
FIG. 6c shows autocorrelations of pulses at a spectral width of 0.35 nm at 1538 nm.

The autocorrelations and spectra for both wavelengths for near transform limited pulse outputs at 1538 nm and 1541.5 nm are shown in FIGS. 6a–6c. The output wavelengths are separated using 0.9-nm bandpass filters. The pulses at 1538 nm and 1541.5 nm both have full-width at half-maximum pulse widths of approximately 6.7 ps (FIG. 6a), a spectral width of 0.35 nm at 1538 nm (FIG. 6c) and a width of 0.37 nm at 1541.5 nm (FIG. 6b), and an average power of 0.28 mW in total. The time-bandwidth products are 0.3 and 0.31 for the 1538 nm and 1541.5 nm pulses, respectively. This is consistent with transform-limited hyperbolic-secant pulse shapes.

Figure 7A:
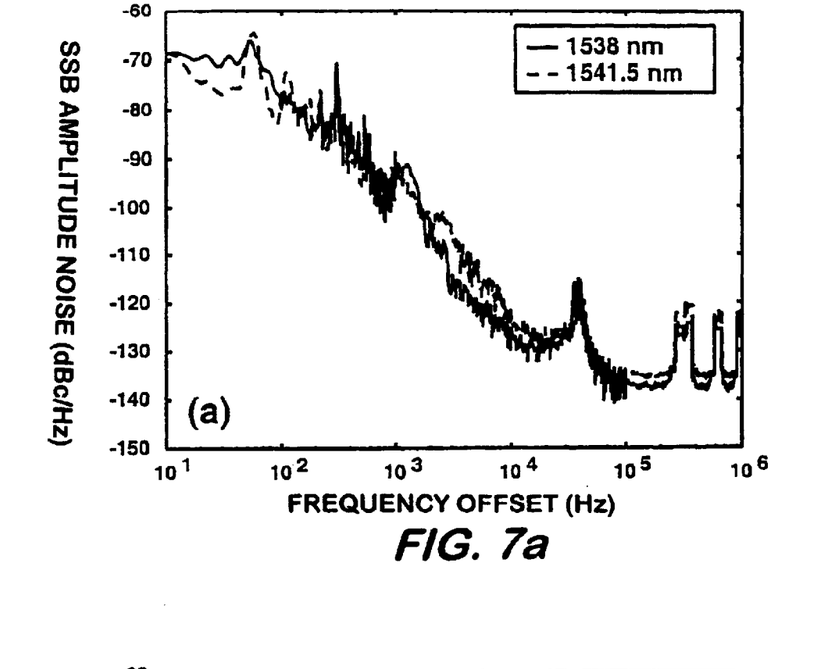
FIG. 7a shows single-sideband amplitude noise, with zero-area spurs removed versus frequency offset from the carrier frequency. The amplitude fluctuations are <0.5% (10 Hz to 1 MHz).
Figure 7B:
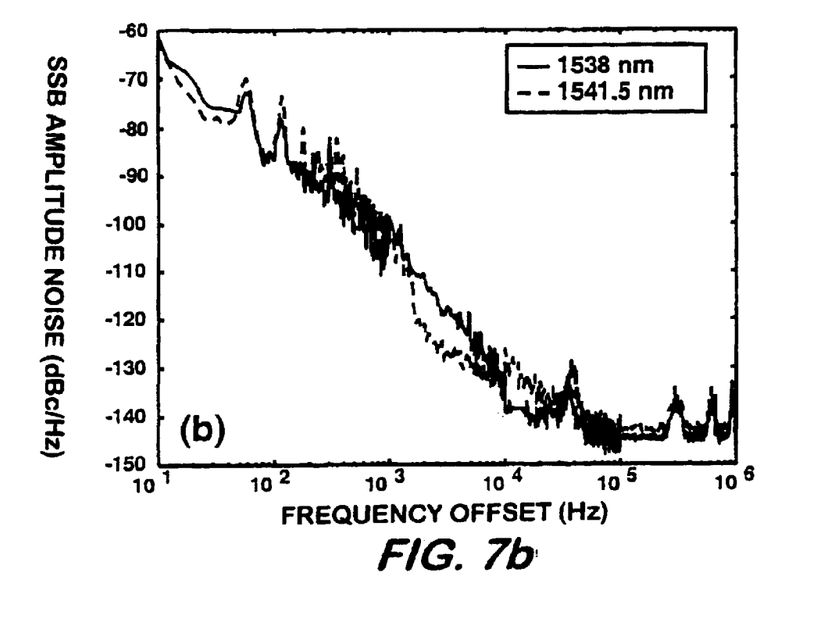
FIG. 7b shows single-sideband phase noise, with zero-area spurs removed, versus frequency offset from the carrier frequency. The timing jitter for each wavelength is <68 fs (1 kHz to 1 MHz).

The amplitude and phase noise of this laser have also been measured; both wavelengths have similar noise characteristics. The measured single-sideband amplitude noise for 1538 nm and 1541.1 nm are shown in FIG. 7a (zero-area spurs have been removed). If the data is integrated over the range from 10 Hz to 1 MHz, we find less than 0.5% amplitude fluctuation. The measured single-sideband phase noise, with the spurs removed, is shown in FIG. 7b. Integrating over the range from 1 kHz to 1 MHz, there is less than 68 fs timing fitter. Even including the low frequencies and integrating from 10 Hz to 1 MHz, the maximum timing jitter is less than 800 fs.

The method to match the higher harmonic drive frequency to the fundamental cavity frequency is not limited to the delay stages used in our laser prototype. The cavity may not need any delay stages if the lengths can be specified exactly. In general, some sort of tunable delay is desirable. Examples include free-space-coupled delay stages and fiber-stretcher delay lines.

The number of wavelengths can also be increased by a variety of ways. Instead of a 2×2 coupler (3-dB coupler), one could use one or more M×N couplers where N is the number of paths to separate the incoming light and M is any number greater than or equal to 1. In each one of the paths, a filter, attenuator, delay stage, and Faraday mirror can be used to complete the cavity (as demonstrated in our two-wavelength version). Another method would be to use a wavelength-division-multiplexer to separate out the different wavelengths, which essentially combines the functions of our 3-dB coupler and bandpass filters.

The pulse spectral width can be changed by using other forms of wavelength filtering in the laser cavity. For example, a bandpass filter with a wider pass-band will allow a wider pulse spectrum to exist. An alternative to the bandpass filters is to use fiber gratings to filter the desired wavelengths. In general, any form of spectral filtering with any pass-band width can be used to set the spectral characteristics of the laser output. The cavity can be stabilized for lower noise performance, for example, similar to the method described in U.S. Statutory Invention Registration H1926. Additionally, each one of the independent paths for the different wavelengths may be stabilized to each other and/or to the external RF synthesizer.

Finally, the net dispersion in the laser cavity can be optimized with the addition or subtraction of any dispersive media. As examples, more optical fiber or a fiber Bragg grating can be used to change the dispersion. For longer wavelengths (such as 1560 nm), the net dispersion should be lowered to achieve transform-limited pulses. One way is to add dispersion compensation, perhaps different amounts to the independent paths, so that all the paths have the same dispersion over the range of operating wavelengths intended for that path. Alternatively, dispersion-flattening can be implemented in the main part of the cavity so that the dispersion is relatively constant over the entire gain spectra.

The invention demonstrates a sigma laser capable of simultaneously generating pulses at multiple wavelengths, using the same physical gain fiber. The wavelength separation is tunable from the limit of the homogeneous linewidth to the limit of the erbium gain bandwidth. Two different center wavelengths (1538 and 1541.5 nm) are shown to have nearly transform-limited 6.7-ps pulses with low noise. The amplitude fluctuation is less than 0.5% (10 Hz to 1 MHz) and the timing jitter is less than 68 fs (1 kHz to 1 MHz). In general, appropriate cavity-dispersion compensation is necessary to achieve transform-limited pulses.

The two-wavelength sigma laser has the same potential for high repetition-rate and low pulse duration as its single-wave-length counterpart. Extension to higher repetition rate and more wavelengths will require more gain. Additionally, with active stabilization, it can achieve lower amplitude and phase noise operation.

Although this invention has been described in relation to an exemplary embodiment thereof, it will be understood by those skilled in the art that still other variations and modifications can be affected in the preferred embodiment without detracting from the scope and spirit of the invention as described in the claims.

What is claimed:

1. A multiple wavelength laser comprising:
   a first branch including:
   pumped optical fiber lasing material for outputting coherent light;
   a splitter connected to said lasing material for dividing said coherent light into at least two paths of differing wavelengths;
   a band pass filter in each said path for selecting a wavelength in each path; and
   a Faraday mirror in each path in optical communication with each band pass filter for operating said laser in a single polarization state.

2. The multiple wavelength laser as in claim 1, further comprising
   a modulator arranged in a second branch coupled to the first branch for generating pulsed coherent light synchronized with an RF synthesizer.

3. The multiple wavelength laser as in claim 1, further comprising
   a second branch coupled to said first branch; and
   an output coupler in said second branch for extracting coherent light from said laser.

4. The multiple wavelength laser as in claim 1, further comprising
   a second branch coupled to the first branch, and
   an isolator connected in the second branch for insuring that operation of the laser is unidirectional.

5. The multiple wavelength laser as in claim 1, further comprising
   variable delay lines connected between the splitter and the Faraday mirrors for adjusting timing of said wavelengths.

6. The multiple wavelength laser of claim 1, further comprising
   a second branch coupled to the first branch by a polarization beam splitter.

7. The multiple wavelength laser of claim 1, further comprising
   a device connected in at least one of the paths for a purpose of amplitude modification.

8. An integrated single output multiple wavelength laser apparatus comprising:
   a first branch, the first branch including:
   pumped optical fiber lasing material for outputting coherent light;

a splitter for dividing said coherent light into at least two paths of differing wavelengths and for selecting the wavelength of each path;

a Faraday mirror in each path for operating said laser in a single polarization state.

9. The multiple wavelength laser apparatus as in claim 8, further comprising a modulator connected in a second branch for generating pulsed coherent light synchronized with an RF synthesizer, the second branch being coupled to the first branch.

10. The multiple wavelength laser apparatus as in claim 8, further comprising an output coupler arranged in a second branch for extracting the coherent light from said laser apparatus, the second branch being coupled to the first branch.

11. The multiple wavelength laser apparatus as in claim 10, further comprising an isolator connected in the second branch for insuring that the operation of the laser is unidirectional.

12. The multiple wavelength laser apparatus as in claim 8, further comprising adjustable delay lines connected in each of the paths for adjusting the timing of said multiple wavelengths.

13. The multiple wavelength laser apparatus as in claim 10, further comprising a polarization beam splitter optically connecting the second branch with the first branch, the second branch being a polarization maintaining loop and the first branch being a single polarization branch.

14. The multiple wavelength laser apparatus of claim 8, further comprising a device connected in at least one of the paths for a purpose of amplitude modification.

15. A multiple wavelength laser comprising:

a polarizing beamsplitter;

a gain medium arranged between the polarizing beamsplitter and a splitter;

a pump source arranged to pump said gain medium; and a splitter optically coupled to said gain material for dividing said light into at least two paths, each of the at least two paths including:
means for selecting a wavelength,
a reflector for reflecting light at the selected wavelength back through the path and through the gain medium.

16. The multiple wavelength laser as in claim 15, wherein said gain medium is an Erbium-doped optical fiber.

17. The multiple wavelength laser as in claim 15, wherein the reflector is a Faraday mirror.

18. The multiple wavelength laser as in claim 15, wherein the means for selecting a wavelength is a bandpass filter.

19. The multiple wavelength laser as in claim 15, wherein the means for selecting a wavelength includes at least one fiber grating.

20. The multiple wavelength laser as in claim 15, further comprising a variable delay line arranged between the gain material and the splitter.

21. The multiple wavelength laser as in claim 15, wherein the splitter is a wavelength division multiplexer.

22. The multiple wavelength laser as in claim 15, further comprising a dispersion compensating device connected between the gain medium and the splitter.

23. The multiple wavelength laser as in claim 22, wherein the dispersion compensating device is an optical fiber.

24. The multiple wavelength laser as in claim 15, wherein at least one of the paths includes a variable delay line arranged between the splitter and the reflector.

25. The multiple wavelength laser as in claim 15, wherein the laser is mode-locked.

26. The multiple wavelength laser as in claim 1, wherein the laser is mode-locked.

27. The multiple wavelength laser as in claim 8, wherein the laser is mode-locked.

28. The multiple wavelength laser as in claim 15, further comprising a polarization maintaining loop coupled to the polarization beamsplitter, the polarization maintaining loop having an output for outputting polarized light.

29. The multiple wavelength laser as in claim 28, wherein the polarization maintaining loop includes a modulator for modulating light in the polarization maintaining loop.

30. The multiple wavelength laser as in claim 29, wherein the laser is mode-locked.

31. The multiple wavelength laser as in claim 29, wherein the modulator is an amplitude modulator.

32. The multiple wavelength laser as in claim 29, wherein the modulator is phase modulator.

33. A multiple wavelength laser system comprising:

a polarization maintaining loop including a modulator and an output;

a birefringence-compensating branch including gain material adapted to be pumped and to output amplified light, a splitter arranged to divide the amplified light into at least two paths, each path including a Faraday mirror and means for selecting a wavelength arranged between the splitter and the Faraday mirror; and a polarizing beamsplitter optically coupling the polarization maintaining loop to the birefringence-compensating branch.

* * * * *